United States Patent
Aoyagi et al.

(10) Patent No.: US 9,845,064 B2
(45) Date of Patent: Dec. 19, 2017

(54) STEERING-WHEEL POWER GENERATION DEVICE

(71) Applicant: ADAMANT CO., LTD., Tokyo (JP)

(72) Inventors: Tomohide Aoyagi, Tokyo (JP); Yasuhiro Hyakutake, Kawaguchi (JP)

(73) Assignee: ADAMANT CO., LTD., Tokyo (JP)

( * ) Notice: Subject to any disclaimer, the term of this patent is extended or adjusted under 35 U.S.C. 154(b) by 0 days.

(21) Appl. No.: 15/515,032

(22) PCT Filed: Sep. 29, 2015

(86) PCT No.: PCT/JP2015/004947
§ 371 (c)(1),
(2) Date: Mar. 28, 2017

(87) PCT Pub. No.: WO2016/051776
PCT Pub. Date: Apr. 7, 2016

(65) Prior Publication Data
US 2017/0225633 A1 Aug. 10, 2017

(30) Foreign Application Priority Data
Oct. 3, 2014 (JP) .................................. 2014-204668

(51) Int. Cl.
*B60R 16/03* (2006.01)
*B62D 1/04* (2006.01)
(Continued)

(52) U.S. Cl.
CPC ................ *B60R 16/03* (2013.01); *B62D 1/04* (2013.01); *H02K 7/1853* (2013.01); *H02N 2/186* (2013.01)

(58) Field of Classification Search
CPC ......... B62D 1/04; H02K 7/1853; H02N 2/186
(Continued)

(56) References Cited

U.S. PATENT DOCUMENTS

2004/0068935 A1 4/2004 Ichikawa et al.
2006/0213315 A1* 9/2006 Faeth .................... B60R 16/027
74/552
(Continued)

FOREIGN PATENT DOCUMENTS

JP 1994-087455 A 3/1994
JP 2002-019550 A 1/2002
(Continued)

OTHER PUBLICATIONS

PCT/ISA/237, "Written Opinion of the International Searching Authority for International Application No. PCT/JP2015/004947," Dec. 28, 2015.
(Continued)

*Primary Examiner* — Jacob D Knutson
(74) *Attorney, Agent, or Firm* — Manabu Kanesaka

(57) ABSTRACT

Provided is a steering-wheel power generation device that, when operating in-vehicle equipment wirelessly from an operation unit provided on a steering wheel, can supply power having high power generation efficiency and space efficiency in line with practical use.
A ring-shaped rack and a gear power generator fitted to the rack are provided in the gripping portion of the steering wheel, and a guide groove portion is provided on an inner wall of the gripping portion, thereby enabling a guide portion to absorb shock other than the shock in the power generation direction, and enabling stable power supply even when the steering wheel is being rotated.

5 Claims, 5 Drawing Sheets

(51) Int. Cl.
  *H02K 7/18* (2006.01)
  *H02N 2/18* (2006.01)
(58) Field of Classification Search
  USPC .......................................................... 180/405
  See application file for complete search history.

(56) References Cited

U.S. PATENT DOCUMENTS

| | | | | |
|---|---|---|---|---|
| 2009/0270223 | A1* | 10/2009 | Cook | B60K 20/06 477/77 |
| 2012/0242465 | A1* | 9/2012 | Murata | B60Q 9/00 340/407.2 |
| 2013/0175806 | A1* | 7/2013 | Tsuneyoshi | H02K 7/1853 290/1 E |
| 2014/0156107 | A1* | 6/2014 | Karasawa | G01C 21/3664 701/1 |
| 2015/0054289 | A1* | 2/2015 | Kaneko | G08C 17/02 290/1 A |

FOREIGN PATENT DOCUMENTS

| | | |
|---|---|---|
| JP | 2004-108035 A | 4/2004 |
| JP | 2006-281822 A | 10/2006 |
| JP | 2009-196607 A | 9/2009 |
| JP | 2010-058673 A | 3/2010 |
| JP | 2011-136665 A | 7/2011 |
| JP | 2013-124514 A | 6/2013 |
| JP | 2014-121902 A | 7/2014 |

OTHER PUBLICATIONS

PCT/ISA/210, "International Search Report for International Application No. PCT/JP2015/004947" dated Dec. 28, 2015.

PCT/ISA/237, "Written Opinion of the International Search Authority for International Application No. PCT/JP2015/004947" dated Dec. 28, 2015.

* cited by examiner

STEERING-WHEEL POWER GENERATION DEVICE

RELATED APPLICATIONS

The present application is National Phase of International Application No. PCT/JP2015/004947 filed Sep. 29, 2015, and claims priority from Japanese Application No. 2014-204668, filed Oct. 3, 2014, the disclosure of which is hereby incorporated by reference herein in its entirety.

TECHNICAL FIELD

The present invention relates to a steering-wheel power generation device which generates power from vibration in traveling or through operation during driving and which enables a single steering wheel to transmit operation information to various in-vehicle devices.

BACKGROUND ART

Some of the steering wheels for passenger cars are currently equipped with a controller which allows a driver to operate various in-vehicle devices such as an air conditioner without taking a hand off from the steering wheel during driving of a vehicle, and the controller enables a driver to operate the various devices without greatly moving the line of sight during driving. Regarding such a steering wheel, a patent application is filed for JP 2002-019550 (hereinafter referred to as Patent Literature 1), which discloses a structure in which a power generator is directly mounted on a steering wheel, and a patent application is filed for JP 2013-124514 (hereinafter referred to as Patent Literature 2), which discloses a structure in which a power generation mechanism is provided in a door handle, as a similar technique.

From among the two structures, the structure described in Patent Literature 1 has a technical feature in which power is generated by using kinetic energy of a section actuated by an operation of a driver, and proposes a steering-wheel power generation device including a motor with a weight as a specific embodiment. In addition, the steering wheel described in Patent Literature 2 has a technical feature in which a coil is wound around an inner wall of a hollow gripping portion and power is generated by an induced electromotive force generated when a magnet provided inside the coil moves, and enables use of a function such as transmission of door open and close information by using the generated power.

CITATION LIST

Patent Literature

Patent Literature 1: JP 2002-019550 A
Patent Literature 2: JP 2013-124514 A

SUMMARY OF INVENTION

Technical Problem

The above Patent Literature 1 and Patent Literature 2 have the above-described technical features and effects from the features. In contrast, upon implementation of the structure described in the above Patent Literature 1, mounting space of an operating member additionally provided on the steering wheel is reduced, and it is necessary to newly secure a space in an area other than an area near a steering center portion, which is an airbag mounting location. In addition, in the structure described in Patent Literature 2, an electromagnetic power generator using slide operation is used. Therefore, there is a problem that it is difficult to obtain an induced electromotive force necessary for power generation if the structure is used for a steering wheel of an automobile in which low-speed swinging operation constitutes a large percentage of the operation.

In addition, since the power generators described in Patent Literature 1 and Patent Literature 2 use a power generator with a rotating weight and an electromagnetic power generator, which prioritize size reduction, respectively, the amount of power necessary for continuous transmission of a signal during driving cannot be obtained.

In view of the above problem, an object of the invention described in the present description is to provide a steering-wheel power generation device capable of supplying power having high power generation efficiency and space efficiency in line with practical use.

Solution to Problem

In order to achieve the above object, an invention according to a first aspect of the present invention is characterized in that a curved guide case is provided inside a gripping portion, and a gear power generator is provided in the guide case. More specifically, a technical feature of the invention according to the first aspect is a mechanism regarding a mounting structure of a gear power generator incorporated in a gripping portion of a steering wheel, where the gear power generator formed to have a shape following the shape of the gripping portion of the steering wheel is swingably provided using an inner wall of the gripping portion as a guide, and power is generated by fitting a rack gear provided on the inner wall of the gripping portion to an input gear of the gear power generator, and rotating the rack gear and the input gear.

In addition, a technical feature of an invention according to a second aspect of the present invention is that a flexible printed wiring board (hereinafter referred to as flexible wiring) is used for supplying power from the gear power generator to the steering wheel.

Advantageous Effects of Invention

Due to the above-described technical feature, the steering-wheel power generation device according to the first aspect of the present invention can provide a steering-wheel power generation device which can supply power having high power generation efficiency and space efficiency in line with practical use. The steering-wheel power generation device can be provided due to the effect obtained by using the gear power generator using the inner wall of the gripping portion as a guide in the structure described in the present description.

More specifically, a guide portion of the power generator is formed of a case of the gear power generator and the inner wall of the gripping portion, and therefore the mounted gear power generator can be arranged in a state where the gear power generator can supply a large power generation amount. That is, by providing the gear power generator at the gripping portion where the shift amount is greatest on the steering wheel, stable power supply is enabled from a shift amount amplified by the gear of the power generator even with a slight steering wheel operation.

In addition, formation of the guide portion enables a rack fitted to the gear power generator to be arranged with a high degree of freedom. Therefore, fitting operation of the rack and the input gear that the power generator includes can be optimized according to a load applied to the gripping portion during actual driving and rotating operation, and power having high power generation efficiency and space efficiency can be supplied. Furthermore, in the present invention, stress acting on the gear power generator in a direction not affecting power generation can be dispersed over the entirety of the inner wall. This is the effect obtained by formation of the above guide portion, and high durability is provided and power can be continuously supplied even when shock due to a steering wheel operation upon acceleration or deceleration, sudden braking, or the like.

In addition, the gear power generator used in the present invention has a structure where the power generator itself moves due to the structure of the power generator, the input gear of the power generator fitted to the rack is rotated, rotation of the input gear is transmitted to an input shaft of a power generation motor provided in the power generator by using a power transmission means such as a gear, and the input shaft is rotated. Therefore, in the present invention, by changing the transmission rate of the power transmission means such as a gear ratio, the load applied to the input gear and the power transmission means and rotation speed of the motor, and the like can be adjusted. In addition, since the configuration where the above power generator itself moves, power supply in line with practical use can be performed by using total weight of the components configuring the gear power generator as an inertial force upon power generation in the structure of the present invention.

In addition to the above effect, by using the invention according to the second aspect of the present invention, the power having high power generation efficiency can be stably supplied to the steering wheel in a space-saving manner.

As described above, by using the structure of the present invention, the steering-wheel power generation device capable of supplying power having high power generation efficiency and space efficiency in line with practical use can be provided.

DESCRIPTION OF EMBODIMENTS

Figure 1:
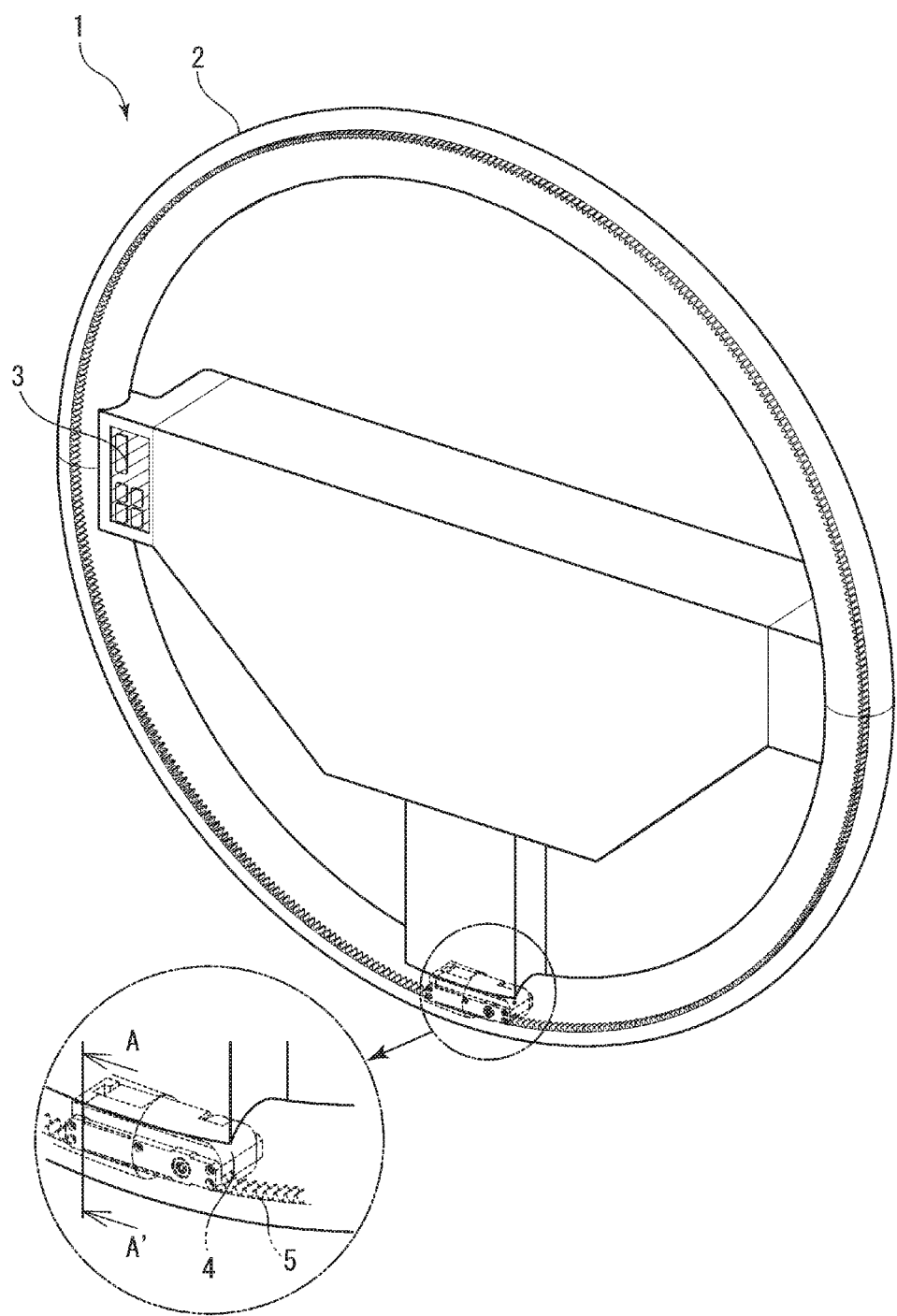
FIG. 1 is an entire perspective view of a steering-wheel power generation device used in a best embodiment of the present invention.

Hereinafter, a best embodiment of the present invention will be described with reference to FIGS. 1, 2, 3, 4, and 5. Note that in the drawings, same reference signs are given to portions having an identical configuration or function.

Figure 2:
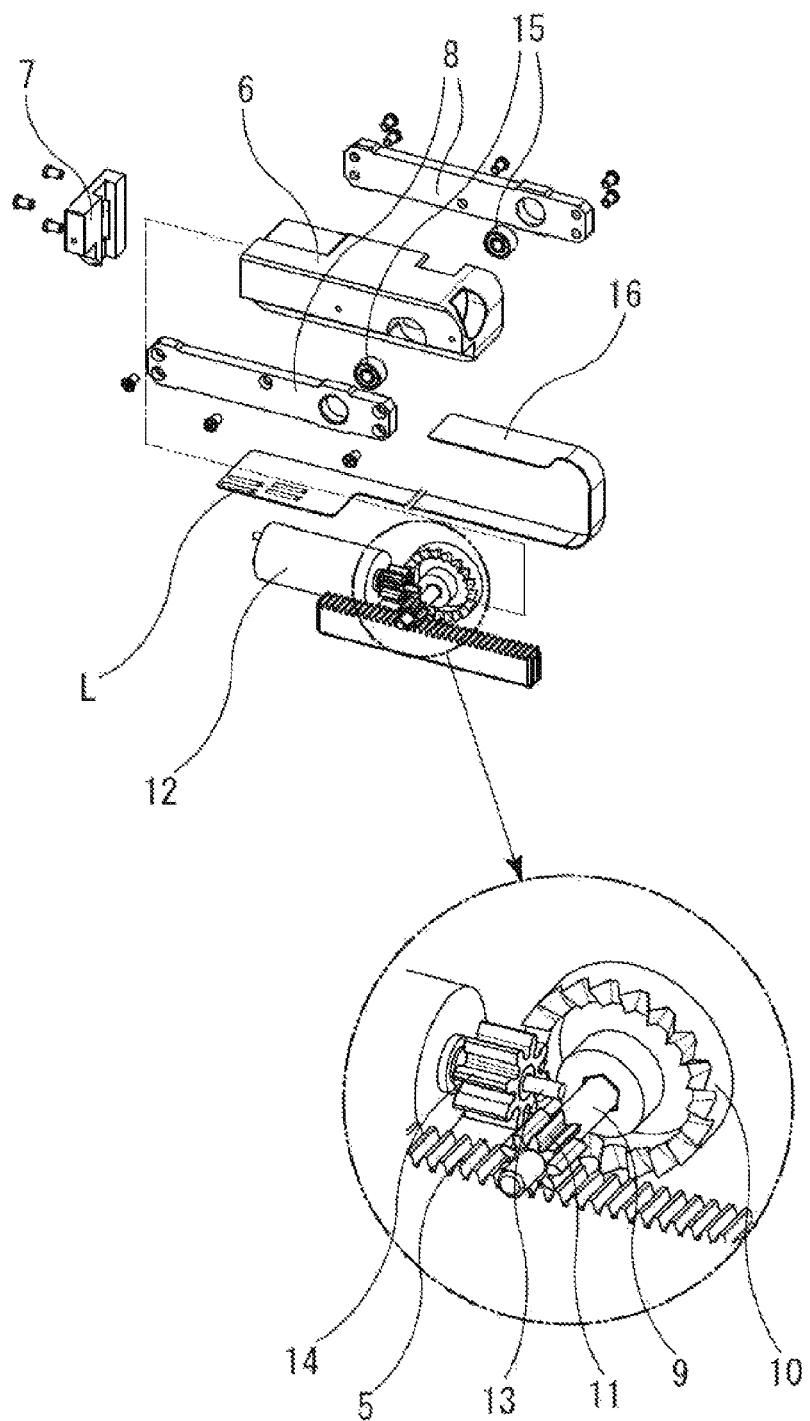
FIG. 2 is an exploded perspective view of a gear power generator provided in the steering-wheel power generation device illustrated in FIG. 1.
Figure 3:
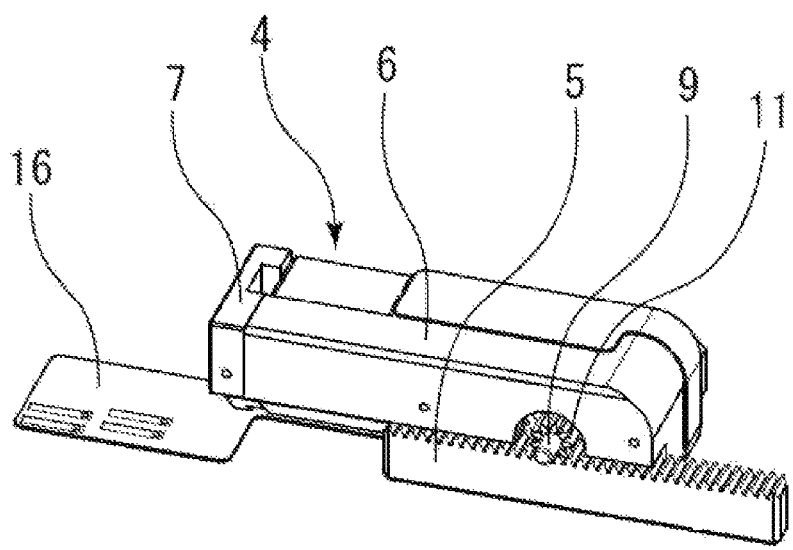
FIG. 3 is an exploded perspective view illustrating a state where a cover of the gear power generator is removed.
Figure 3:
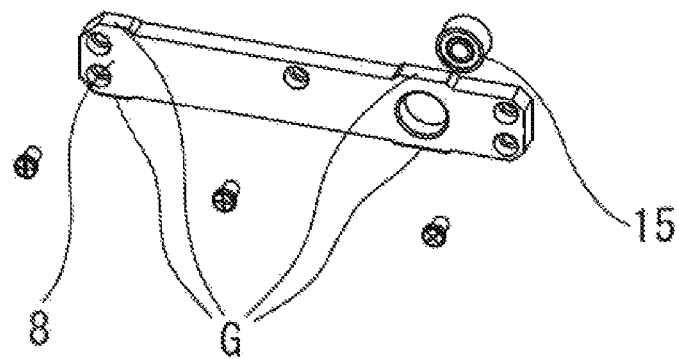
Figure 4:
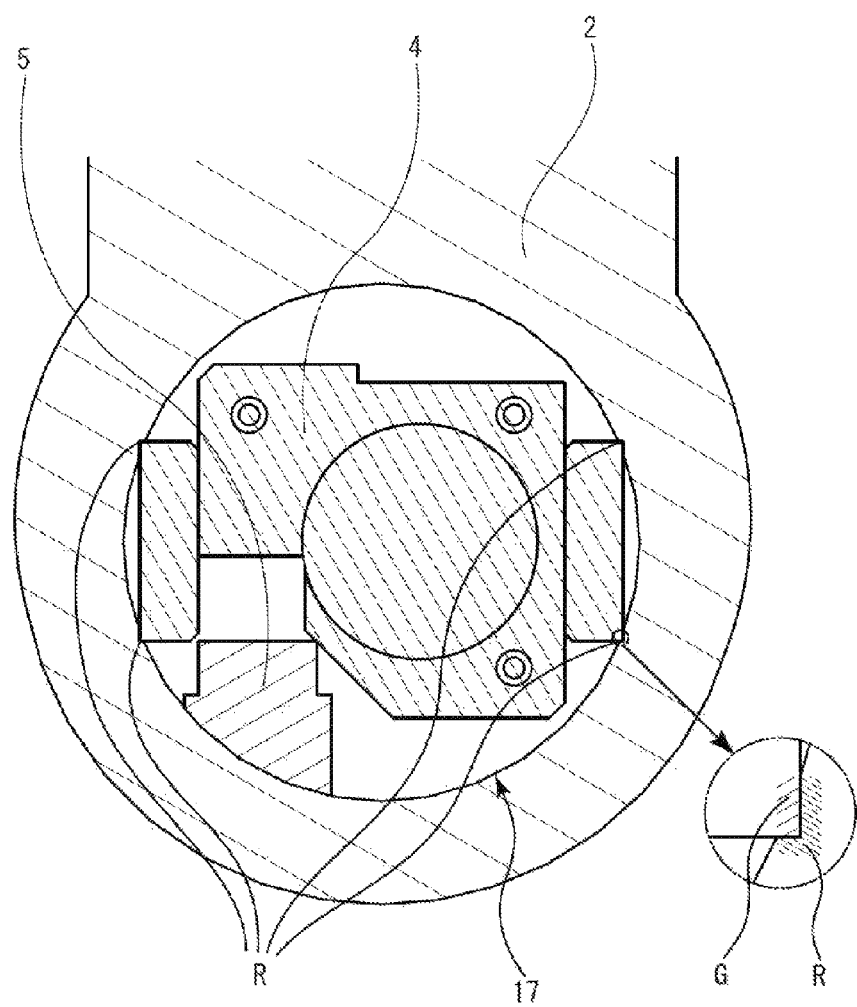
FIG. 4 is a longitudinal cross-sectional view along line A-A' in an enlarged view in FIG. 1.
Figure 5:
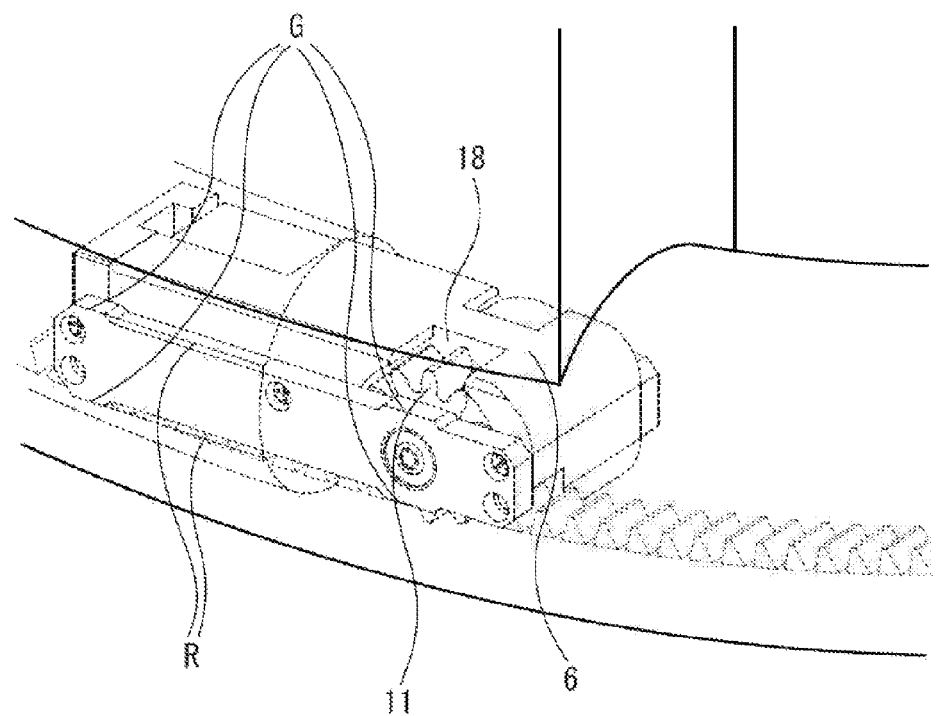
FIG. 5 illustrates a modification of the gear power generator illustrated in FIG. 1.

FIG. 1 illustrates an entire perspective view of a steering-wheel power generation device used in the best embodiment of the present invention, FIG. 2 illustrates an exploded perspective view of a gear power generator provided in the power generation device, FIG. 3 illustrates an exploded perspective view illustrating a state where a cover of the gear power generator is removed, FIG. 4 illustrates a longitudinal cross-sectional view along line A-A' in an enlarged view in FIG. 1, and FIG. 5 illustrates a modification of the gear power generator illustrated in FIG. 1. Note that an extension portion of a flexible printed wiring board supplying power from the gear power generator, a capacitor storing the power, a signal transmission unit transmitting a signal to in-vehicle equipment, and wiring portions of the above portions and unit are not illustrated in the drawings.

As can be seen from FIGS. 1 and 2, a steering-wheel power generation device 1 according to the present embodiment has a circular outer shape, a gripping portion 2 is formed into a cylindrical shape, and an inner wall of the gripping portion 2 is brought into contact with a cover 8 of a gear power generator 4. By adopting such a structure, in the steering-wheel power generation device 1 according to the present embodiment, a ring-shaped rack 5 provided on the inner wall, the rack 5 being encircled by a thin line in FIG. 1, and a case-side pinion gear 11 provided on a case-side input shaft 9 of the gear power generator 4 are fitted to each other, stress acting on the gear power generator 4 in a direction not affecting power generation is dispersed over the entirety of the inner wall, and thus stress concentration in a direction other than a driving direction between the case-side pinion gear 11 and the ring-shaped rack 5 can be prevented. In addition, by using the ring-shaped rack 5, limitation on the movement amount of the gear power generator 4 is eliminated, and power can be continuously supplied to the capacitor without interruption even when the gripping portion 2 is rotated at 360 degrees. Note that in the present embodiment, a flexible printed wiring board 16 is used for connection between the gear power generator and the capacitor; however, from an identical technical viewpoint, the flexible printed wiring board 16 can be replaced with a contact brush such as a spring terminal provided on a gear power generator side and a contact for the brush provided on the entire periphery of the inner wall of the gripping portion. Note that a ring-shaped guide groove R to be described later is partially illustrated in FIGS. 4 and 5, which illustrate an enlarged view portion encircled by the thin line in the present drawing.

In addition, as can be seen from FIGS. 2, 3, and 4, in the steering-wheel power generation device 1 according to the present embodiment, the gripping portion 2 in which a power generation motor and the like are housed and fixed is hollow, a bottom surface of a power generation motor 12 provided in the gripping portion is fixed by a housing bottom portion 7, and thus a case of the gear power generator 4 is configured. In addition, regarding the inside of the case, a power generation mechanism is used where the power generation motor 12 in which a motor-side pinion gear 14 is provided on an motor input shaft 13, a crown gear 10 transmitting power to the pinion gear 14, and the case-side input shaft 9 of the gear power generator 4 to which the crown gear 10 is fixed are arranged in a housing, and the case-side input shaft 9 is rotatably supported by a bearing 15 provided in the cover 8. Since the pinion gear 11 attached to the case-side input shaft 9 is arranged to be meshed with the ring-shaped rack 5 separately fixed to the inner wall of the gripping portion when the pinion gear 11 is incorporated, the input shaft 9 can be rotated in association with movement of the gear power generator 4 and the power generation motor 12 can be driven. In addition, in the present embodiment, the crown gear 10 is arranged by notching a housing 6. Therefore, the diameter of the crown gear 10 is maximally secured in a limited mounting space, and the power generation motor 12 can be driven at a high rotation speed upon transmission of a rotation force from the crown gear 10 to the motor input shaft 13.

In addition to the above basic structure, in the present embodiment, a guide mechanism is provided where the case of the gear power generator 4 is supported by the ring-shaped guide groove R provided on the inner wall of the gripping portion 2. More specifically, as illustrated in FIGS. 3 and 4, a structure is adopted where a guide portion G of the cover configuring the case of the gear power generator and the ring-shaped guide groove R are fitted to each other. Therefore, the steering-wheel power generation device according to the present embodiment can achieve improvement in the power generation efficiency and reduction in the number of components. In addition, durability can be improved and the size can be easily reduced due to the simplified structure.

That is, in the present embodiment, the above-described guide mechanism enables stress in a direction other than a movement direction upon power generation, applied to the gear power generator, to be dispersed over a contact surface between the guide portion G provided on the case and the ring-shaped guide groove R. Thus, in the steering-wheel power generation device according to the present embodiment, concentration of the stress on the case-side input shaft 9 of the gear power generator 4 and the rack 5 can be prevented, the number of components can be reduced while improving durability as the steering-wheel power generation device, and the size can be easily reduced. In addition, since the motor input shaft 13 and the case-side input shaft 9 are separately provided and are arranged to be direct with each other, the motor input shaft 13 is protected against strain generated upon driving and durability of the steering-wheel power generation device including the power generation mechanism inside the case can be improved. Note that in the present embodiment, a structure is adopted where the stress is absorbed by the cover 8 and a side surface of the housing 6 to which the cover 8 is attached; however, from a similar technical viewpoint, a similar guide mechanism may be provided by configuring a case surface in a direction other than the movement direction of the gear power generator 4 to have a structure inscribed in the inner wall of the gripping portion or by separately providing a slide guide or the like on the case surface, and thus durability can be improved.

In addition, in the present embodiment, a structure is adopted where the gear power generator itself moves along the guide mechanism, the case-side pinion gear 11 meshed with the ring-shaped rack 5 rotates the case-side input shaft 9, and thus power is transmitted to the crown gear 10 fixed to the input shaft 9 and the motor input shaft 13 which rotates in association with the crown gear 10. Therefore, in the structure according to the present embodiment, weight of most of the components configuring the gear power generator 4 can be used as an inertial force upon power generation. In addition, in the present embodiment, by changing the gear ratios of the ring-shaped rack 5, the crown gear 10, the case and motor input shafts, the power generation mechanism in the steering-wheel power generation device can be optimized to a configuration corresponding to an external force generated in an environment where the steering-wheel power generation device is used, and overall power generation efficiency can be improved. Note that in the present embodiment, by using high specific gravity material for constituent components of the case such as the housing bottom portion 7, a function as a weight is added to the constituent components. Therefore, effects such as an increase in an inertial force acting on the gear power generator 4 during movement of the gear power generator 4 and stabilization of the movement speed of the gear power generator 4 can be obtained. In the drawings, 3 denotes an operation unit, 17 denotes a guide case, and L denotes a transmission land.

Note that from a technical viewpoint identical with that of the present embodiment, as illustrated in FIG. 5, the diameter of the case-side pinion gear 11 can also be enlarged by separately providing a notch 18 to the housing 6. In the drawing, G denotes the guide portion, and R denotes the ring-shaped guide groove.

As described above, by adopting the structure described in the embodiment of the present application, the steering-wheel power generation device capable of supplying power having high power generation efficiency and space efficiency in line with practical use can be provided.

REFERENCE SIGNS LIST

1 steering-wheel power generation device
2 gripping portion
3 operation unit
4 gear power generator
5 rack
6 housing
7 housing bottom portion
8 cover
9 case-side input shaft
10 crown gear
11 case-side pinion gear
12 power generation motor
13 motor input shaft
14 motor-side pinion gear
15 bearing
16 flexible printed wiring board
17 guide case
18 notch
G guide portion
L transmission land
R ring-shaped guide groove

The invention claimed is:

1. A steering-wheel power generation device, comprising:
   a gripping portion having a circular outer shape and formed into a cylindrical shape;
   a curved guide case which is provided inside the gripping portion;
   a ring-shaped rack which is provided on an inner wall of the gripping portion;
   a case-side pinion gear which is fitted to the rack; and
   a gear power generator which is provided in the guide case.

2. The steering-wheel power generation device according to claim 1, wherein power is supplied from the gear power generator via a flexible printed wiring board.

3. The steering-wheel power generation device according to claim 1, wherein the gripping portion includes ring-shaped guide grooves therein fitted to a guide portion of a cover forming the guide case.

4. The steering-wheel power generation device according to claim 3, further comprising a power generation motor arranged in the gripping portion and having a motor input shaft and a motor-side pinion gear provided on the motor input shaft.

5. The steering-wheel power generation device according to claim 4, further comprising a crown gear connected to the case-side pinion gear through a case-side input shaft, configured to mesh with the motor-side pinion gear and transmit power to the motor-side pinion gear.

* * * * *